US011861545B1

(12) United States Patent
Atkinson et al.

(10) Patent No.: US 11,861,545 B1
(45) Date of Patent: Jan. 2, 2024

(54) TOKENIZATION OF SHIELDED SHIPPING DATA

(71) Applicant: Stamps.com Inc., El Segundo, CA (US)

(72) Inventors: Charles John Atkinson, El Segundo, CA (US); Jonathan Michael Bourgoine, Encino, CA (US)

(73) Assignee: Auctane, LLC, Austin, TX (US)

( * ) Notice: Subject to any disclaimer, the term of this patent is extended or adjusted under 35 U.S.C. 154(b) by 458 days.

(21) Appl. No.: 16/897,084

(22) Filed: Jun. 9, 2020

(51) Int. Cl.
*G06Q 10/08* (2023.01)
*G06F 21/62* (2013.01)
*G06Q 10/0832* (2023.01)
*G06Q 10/0835* (2023.01)

(52) U.S. Cl.
CPC ..... *G06Q 10/0832* (2013.01); *G06F 21/6254* (2013.01); *G06Q 10/0835* (2013.01)

(58) Field of Classification Search
CPC ............ G06Q 10/0832; G06Q 10/0835; G06F 21/6254
USPC ......................................................... 705/65
See application file for complete search history.

(56) References Cited

U.S. PATENT DOCUMENTS

| 7,533,113 | B1* | 5/2009 | Haddad | G06Q 30/02 |
| 8,763,142 | B2 | 6/2014 | McGuire et al. | |
| 9,805,329 | B1* | 10/2017 | Biswas | G06Q 10/0832 |
| 10,530,577 | B1* | 1/2020 | Pazhoor | H04L 9/3247 |
| 2012/0221421 | A1* | 8/2012 | Hammad | G06Q 10/00 705/16 |
| 2017/0220975 | A1* | 8/2017 | Oba | G06F 16/316 |
| 2019/0102805 | A1* | 4/2019 | Gersh | G06Q 30/0271 |
| 2019/0109706 | A1* | 4/2019 | Peterson | H04L 9/0825 |
| 2019/0161190 | A1* | 5/2019 | Gil | B65G 1/0435 |
| 2021/0286861 | A1* | 9/2021 | Churchill | G06F 21/10 |

FOREIGN PATENT DOCUMENTS

WO    WO-2017161403 A1 *  9/2017

OTHER PUBLICATIONS

Regulation (EU 2016/679 of the European Parliament and of the Council, May 3, 2016, 119 pages) (Year: 2016).*

* cited by examiner

*Primary Examiner* — James D Nigh

(57) ABSTRACT

Systems and methods which provide tokenization of various shipping data for which shielding is desired are described. Embodiments may facilitate controlled and/or protected usage of shielded shipping data, such as may include personally identifiable information, with tokenization. Shielded shipping data tokens of embodiments are matched with an entity, party, system, permitted usage of corresponding shielded shipping data. A data shielding service system may shield usage of shielded shipping data in accordance with applicable regulations according to applicable rules, and/or the like. Permitted accessors may be relieved of demands of maintaining compliance with the regulations and rules with respect to shielded shipping data in light of their enforcement and compliance being imposed through tokenization of the shielded shipping data.

25 Claims, 7 Drawing Sheets

TOKENIZATION OF SHIELDED SHIPPING DATA

TECHNICAL FIELD

The present invention relates generally to shipping data and, more particularly, to facilitating controlled and/or protected use, storage, access, dissemination, etc. of shielded shipping data with tokenization.

BACKGROUND OF THE INVENTION

It is commonplace for merchants, whether they be "brick and mortar" merchants, online merchants, etc., to ship goods using a number of forms of shipping services and media, such as letters, flats, and parcels, via various shipping service providers, such as the United States Postal Service (USPS), United Parcel Service (UPS), Federal Express (FedEx), Dalsey, Hillblom and Lynn (DHL), and local and regional couriers. For example, with the advent of the Internet and numerous electronic marketplaces (e.g., eBay, Amazon Marketplace, Shopify, BigCommerce, Etsy, Magento Commerce, etc.), not only have the number of items shipped increased appreciably in recent years, but so too have the number of shippers and recipients of such items. Accordingly, more and more shippers, including not only large scale business traditionally involved with high volume shipping but also less sophisticated smaller entities tasked with an appreciable number of shipments, are processing relatively large numbers of items for shipment.

Processing of items for shipment necessarily involves information regarding the intended recipient, and often includes additional information (e.g., information regarding the shipper, the merchant, the items shipped, payment, shipping preferences and services, etc.). This information may include information for which its use, disclosure, and/or retention is protected or which is otherwise to be shielded in some manner. For example, intended recipient information (e.g., as may include recipient name and contact information) may comprise personally identifiable information (PII), which is protected in a number of ways under the European General Data Protection Regulation (GDPR), the California Consumer Privacy Act (CCPA), and/or other data privacy regulations. As another example, information regarding the items shipped, or even information regarding the merchant, may provide an indication of the contents of a shipment and pose a significant enough increase in the loss risk for the shipment that insurance for the shipment may be unavailable if such information is not protected. Moreover, the data may be of a nature for which safe-guarding against exposure to various third parties is otherwise desired.

Shippers/merchants often use various forms of computing equipment to automate or otherwise perform a number of tasks with respect to processing items for shipment. With the proliferation of processor-based platforms, such as personal computers (PCs), tablet devices, smart phones, personal digital assistants (PDAs), and servers, capable of executing instruction sets for providing specialized or generalized functionality, such as word processing, accounting, document generation and management, printing, data communication, and image capture, generation, and management, the use of such computing equipment has become nearly ubiquitous in both business as well as personal settings. The use of such processor-based systems for processing items for shipment has become widespread. For example, electronic marketplace systems generally provide some form of shipment processing functionality accessible via a user's processor-based device. Additionally or alternatively, merchants and shippers may use various functionality of one or more services external to an electronic marketplace system through which an item or items are sold in order to avail themselves of desired shipment processing functionality.

The above mentioned processor-based systems generally provide for some combination of storing, displaying, printing, and/or transmitting of data, including some or all of the information for which its use, disclosure, and/or retention is protected or which is otherwise to be shielded in some manner. For example, a shipper or merchant's processor-based system may store various information regarding a shipment, including intended recipient information, shipper/merchant information, item information, payment information, shipping preferences and services information, etc. Additionally, a shipper or merchant's processor-based system may print shipping labels, packing lists, bills of lading, customs forms, etc. including information regarding a shipment, including intended recipient information, shipper/merchant information, item information, payment information, shipping preferences and services information, etc. It is typically left to the individual shipper/merchant to ensure compliance with data privacy regulations (e.g., GDPR, CCPA, etc.), protect the data from security breaches, and/or other data protection considerations (e.g., insurance-based data disclosure considerations).

BRIEF SUMMARY OF THE INVENTION

The present invention is directed to systems and methods which provide tokenization of various shipping data for which shielding is desired. Embodiments may, for example, facilitate controlled and/or protected use, storage, access, dissemination, etc. of shielded shipping data with tokenization. Such shielded shipping data may include information for which regulatory protection is provided (e.g., PII protected by regulations of GDPR, CCPA, etc.), information for which protection is desired or otherwise advantageous with respect to a shipper/merchant, intended recipient, etc. (e.g., information regarding the shipper, the merchant, the items shipped, payment, shipping preferences and services, etc. for which some level of controlled and/or protected use is to be provided for the benefit of one or more parties).

In accordance with embodiments of the invention, a data shielding service system may be provided for use by one or more parties associated with shipment of items. A data shielding service system may, for example, implement data shielding logic configured to tokenize some or all shipping data provided thereto. The tokenized shipping data may be stored by the data shielding service system as shielded shipping data, such as in a shielded shipping data database. A token or tokens corresponding to a shielded shipping data record, or some portion thereof (e.g., data field), may be provided by the data shielding service system for use by one or more systems (e.g., shipper systems, merchant systems, electronic marketplace systems, shipping management systems, shipping service provider systems, recipient systems, etc.) for facilitating controlled and/or protected (collectively referred to herein as shielded) use, storage, access, dissemination, etc. (collectively referred to herein as usage) of shielded shipping data.

Shielded shipping data tokens of embodiments are matched with an entity, party, system, (e.g., shipper, merchant, electronic marketplace, shipping management provider, shipping service provider, recipient, etc., and/or their associated systems, collectively referred to herein as permitted accessor) permitted usage of corresponding shielded shipping data. For example, shielded shipping data tokens may be matched or otherwise associated with a permitted accessor through use of embedded or otherwise linked identification credentials (e.g., integration ID, electronic serial number (ESN), passphrase, personal identification number (PIN), etc.) for the respective permitted accessor. Shielded shipping data tokens may comprise or otherwise be associated with information regarding the particular shielded shipping data or portion thereof for usage, the permitted usage(s), etc. Accordingly, a shielded shipping data token may be utilized by a permitted accessor to obtain usage of shielded shipping data, such as on-demand, in real-time, etc., without systems of the permitted accessor storing shielded shipping data for extended periods of time, or at all. In some embodiments, for example, a permitted accessor or other entity may disseminate shielded shipping data tokens (e.g., printing in place of certain shielded shipping data on shipping documents, providing electronically to another entity (e.g., another permitted accessor) in a shipping service transaction, etc.) so that the permitted accessor(s) need not have or store the actual data of the shielded shipping data.

Tokenization of shipping data by a data shielding service system may, according to some embodiments, be implemented in association with one or more other services provided with respect to the shipping data. For example, various entities (e.g., shipper, merchant, electronic marketplace, shipping management provider, shipping service provider, recipient, etc.) performing some aspect of shipment processing may provide shipping data for application of one or more functionalities (e.g., address cleansing, customs processing, postage indicia generation, shipping management, shipping label generation, etc., collectively referred to herein as shipping support services). A data shielding service system may comprise shipping support services logic, such as to provide address cleansing, customs processing, etc., whereby data shielding logic configured to tokenize some or all shipping data is also implemented with respect to the shipping data. In accordance with embodiments, one or more shielded shipping data token may be returned to an entity providing shipping data for such shipping support services. Accordingly, a data shielding service system may store the shipping data as processed according to shipping support services logic applying one or more functionalities thereto.

In accordance with embodiments of the invention, a data shielding service system may shield usage of shielded shipping data in accordance with applicable regulations (e.g., GDPR, CCPA, etc.), according to applicable rules (e.g., insurance requirements, shipper/merchant guidelines, appropriate usage rules, and/or other user defined rules regarding usage of shipping data), and/or the like. For example, data shielding logic of a data shielding service system may store shielded shipping data for only as long as permitted by applicable regulation(s)/rule(s), provide access to shielded shipping data to permitted accessors only to the extent and in accordance with applicable regulation(s)/rule(s), etc. Permitted accessors may thus be relieved of demands of maintaining compliance (e.g., limitations regarding the disclosure or exposure of the data, guidelines regarding the use of data, requirements regarding the deletion or expungement of data, etc.) with the regulations and rules with respect to shielded shipping data in light of their enforcement and compliance being imposed through tokenization of the shielded shipping data.

In an example of tokenization of shipping data comprising PII, an ecommerce user may enter their address and contact information during checkout through a merchant system or electronic marketplace system. The merchant system or electronic marketplace system may pass this information directly to a data shielding service system, possibly without storing the information in other than transitory memory, for address cleansing (e.g., to ensure a valid recipient address suitable for shipment of purchased items has been provided). The data shielding service system may, in addition to providing address cleansing functionality, tokenize the cleansed address and contact information. The cleansed address and contact information may be stored by the data shielding service system in accordance with any applicable regulations, rules, etc. One or more shielded shipping data tokens may be provided to the merchant system or electronic marketplace system for their usage of the shielded shipping data. For example, the merchant system or electronic marketplace system may use a shielded shipping data token when printing a shipping label for shipment of purchased items. The shielded shipping data token may permit usage of the shielded shipping data in which the shielded shipping data (e.g., some portion of the cleansed address information) is returned to the merchant system or electronic marketplace system for performing a shipping label printing operation. Alternatively, the shielded shipping data token may permit usage of the shielded shipping data in which the shielded shipping data token, or an identifier or index thereto, is printed on a shipping label to enable and provide subsequent usage of respective shielded shipping data (e.g., printing a barcode but no human readable content, and enabling a device to decode the barcode and access some portion of the shielded shipping data and provide a human readable address, such as to carrier handling a package containing the shipped item, or generate a label having a human readable address for over-labeling of a package by a shipping service provider).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
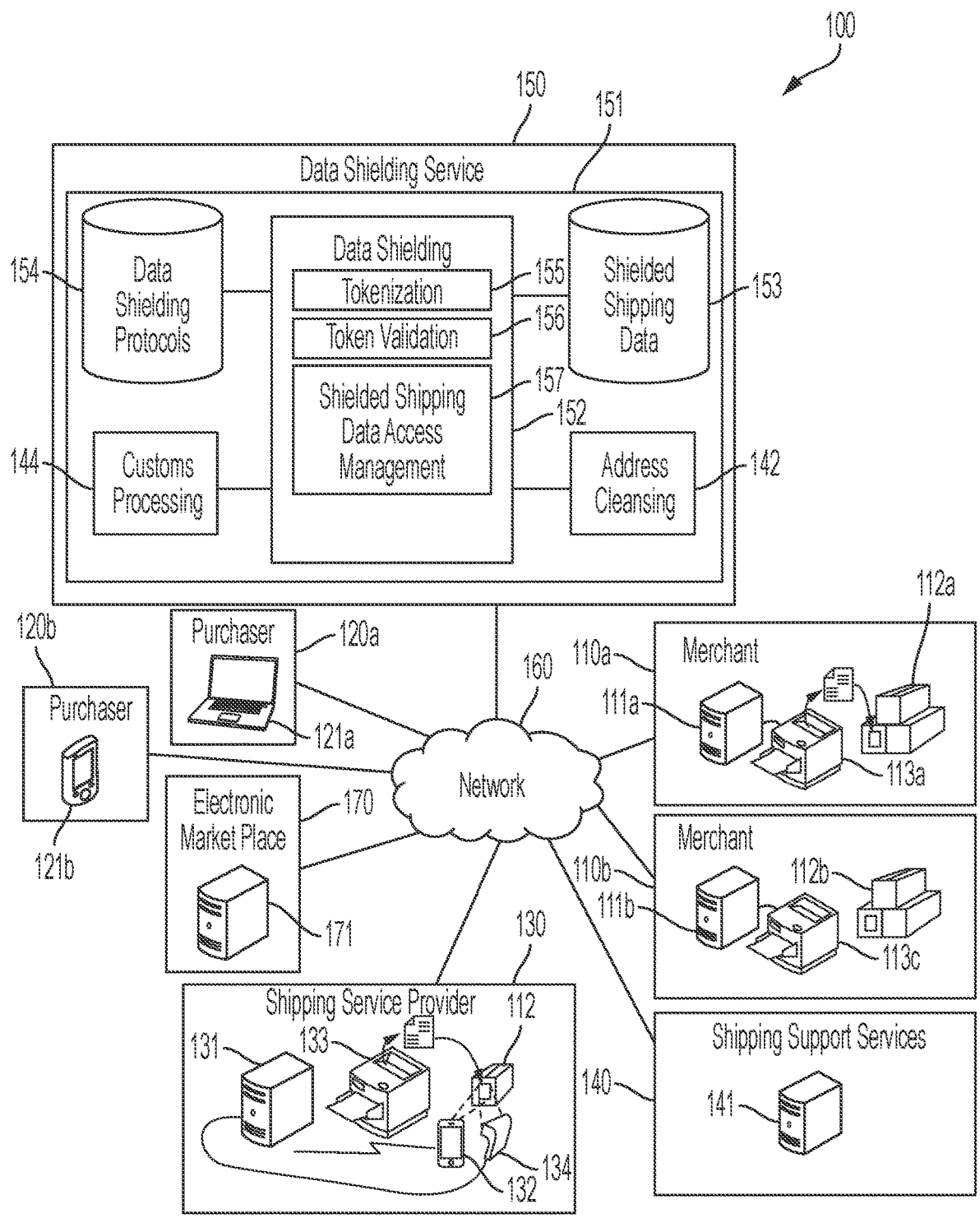
FIG. 1 shows a shipping environment in which tokenization of shielded shipping data is implemented according to embodiments of the present invention.

An embodiment of a shipping ecosystem in which tokens corresponding to shielded shipping data record are provided for usage of shielded shipping data in accordance with concepts herein is shown in FIG. 1. In particular, FIG. 1 shows shipping environment 100 including a plurality of entities, including merchants 110a and 110b, purchasers 120a and 120b, shipping service provider 130, shipping support services 140, data shielding service 150, and electronic marketplace 170 providing operation to facilitate purchase of items and/or related functionality (e.g., functionality related to item shipment), as described further below. It should be appreciated that the particular numbers of merchants, purchasers, shipping service providers, shipping support services, data shielding services, and electronic marketplaces shown in the example of FIG. 1 are illustrative and are not indicative of the scale of the shipping ecosystem of shipping environment 100.

Although the environment in which merchants 110a and 110b, purchasers 120a and 121b, shipping service provider 130, shipping support services 140, data shielding service 150, and electronic marketplace 170 are interacting is referred to herein as a shipping environment, it should be understood that some or all such entities may not themselves be directly involved in or facilitate shipping functionality. For example, data shielding service 150 may provide data shielding services utilized by one or more entities performing some aspect of shipping (e.g., an entity shipping an item, a shipping management software as a service provider, a shipping service provider transporting an item in shipment, a recipient of a shipped item, etc.) without the data shielding service itself providing any shipping functionality. Similarly, electronic marketplace 170 may provide a software platform facilitating sales, and ultimately shipment, of items, but may nevertheless itself not provide any shipping functionality. In accordance with some embodiments, any such system of shipping environment 100 may provide shipping functionality. For example, data shielding service 150 may provide shipping functionality in the form of address cleansing, customs processing, postage indicia generation, shipping management, shipping label generation, etc.

Network 160 provides communication links with respect to and between merchant systems, purchaser systems, shipping service provider systems, shipping support service systems, electronic marketplace systems, data shielding service systems, and/or other systems of shipping environment 100 for facilitating operation as described herein. Accordingly, the links of network 160 are operable to provide suitable communication links for facilitating cooperative interaction and data transfer as described with respect to embodiments of the invention. Network 160 of embodiments may thus comprise one or more of a local area network (LAN), metropolitan area network (MAN), wide area network (WAN), wireless LAN (WLAN), the Internet, intranet, extranet, cable transmission system, cellular communication network, the public switched telephone network (PSTN), and/or the like.

Purchaser systems 121a and 121b of embodiments herein provide systems by which a purchaser of items may interact with merchants to facilitate procuring items by the purchaser. Accordingly, a plurality of merchants (e.g., merchants 110a and 110b) may conduct transactions with a plurality of purchasers via purchaser systems 121a and 121b. The merchants may offer various items, shown as items 112a and 112b, for purchase by purchasers 120a and 120b directly through merchant systems 111a and 111b and/or indirectly through electronic marketplace system 171 of electronic marketplace 170.

Purchaser systems 121a and 121b of embodiments may comprise any number of system configurations used by a user for selecting, purchasing, or otherwise requesting one or more items to be procured by the purchaser from a merchant. For example, either or both of purchaser systems 121a and 121b may comprise a general purpose processor-based system (e.g., personal computer (PC) having a processor, memory, suitable input/output (I/O) functionality, and operating system (OS)) operating under control of an instruction set (e.g., a client application such as a PC client, web client, mobile client, tablet client, etc.) to interface with any of merchant systems 111a and 111b and/or electronic marketplace system 171 and provide operation as described herein. Additionally or alternatively, either or both of purchaser systems 121a and 121b may comprise a processor-based mobile device such as a smart phone, a tablet device, a personal digital assistant (PDA), an Internet appliance (e.g., a processor-based electronic commerce appliance), etc., having the requisite instruction set and processing and I/O resources. As another example, either or both of purchaser systems 121a and 121b may comprise a smart speaker (e.g., Amazon ECHO, Google HOME, etc.) or other voice interface (e.g., Apple SIRI, Google Assistant, etc.) operating on a processor-based platform and operable to provide functionality as described herein. Purchaser systems 121a and 121b may be configured to cooperate with various systems of the shipping ecosystem (e.g., merchant systems 111a and 111b, shipping service provider system 131, shipping support services system 141, data shielding service system 151, electronic marketplace system 171, etc.) to facilitate purchase of items and/or related functionality. Although not shown in the illustrated example of shipping environment 100, purchaser systems 121a and 121b may include or otherwise utilize various peripherals and/or devices, such as printers, scanners, electronic pointing devices, voice command interface devices, credit card readers, etc.

Merchant systems 111a and 111b of embodiments are configured to cooperate with purchaser systems 121a and 121b and/or electronic marketplace system 171, such as to conduct item sale transactions (e.g., e-commerce sales transactions, such as may include order processing, payment processing, remittance to intermediaries or other parties for items sold, etc.) with various purchasers of the merchant's goods (e.g., via purchaser systems 121*a* and 121*b*), and/or item fulfilment operations (e.g., inventory management, item picking and packaging scheduling, shipping/delivery label and/or other documentation generation, etc.). Merchant systems 111*a* and 111*b* may additionally or alternatively be configured to cooperate with various other systems of the shipping ecosystem (e.g., purchaser systems 121*a* and 121*b*, shipping service provider system 131, shipping support services system 141, data shielding service system 151, electronic marketplace system 171, etc.) to facilitate purchase of items and/or related functionality. Merchant systems 111*a* and 111*b* of embodiments may comprise processor-based systems operable under control of an instruction set or instruction sets defining operation as described herein. For example, merchant systems 111*a* and 111*b* of embodiments each comprise one or more processors (e.g., a CORE or PENTIUM processor available from Intel, Inc.) and requisite processor readable (e.g., computer readable) memory (e.g., RAM, ROM, flash memory, disk memory, SSD memory, optical memory, and/or the like) and input/output components (e.g., display, NIC, keyboard, digital pointer, printer, and/or the like) coupled to a processor of the one or more processors via a data bus. Merchant systems 111*a* and 111*b* may include or otherwise utilize various peripherals and/or devices, such as printers, scanners, electronic pointing devices, voice command interface devices, etc., such as printers 113*a* and 113*b* as shown in the illustrated example of shipping environment 100. Printers 113*a* and 113*b* may, for example, comprise printer equipment (e.g., ink jet printer, laser printer, thermal printer, etc.) used by merchants 110*a* and 110*b* to print pick tickets, invoices, packing lists, shipping labels, postage indicia, bills of lading, customs forms, etc.

Electronic marketplace 170 may comprise one or more electronic marketplace systems 171 (e.g., web server, electronic commerce server, computer workstation, enterprise computer network, user interface portal, etc.) of an electronic marketplace, such as eBay, Amazon Marketplace, Shopify, etc. In accordance with some embodiments, electronic marketplace system 171 may comprise one or more processors (e.g., a CORE or PENTIUM processor available from Intel, Inc.) and requisite processor readable (e.g., computer readable) memory (e.g., RAM, ROM, flash memory, disk memory, SSD memory, optical memory, and/or the like) and input/output components (e.g., display, NIC, keyboard, digital pointer, printer, and/or the like) coupled to a processor of the one or more processors via a data bus. Electronic marketplace system 171 may be configured to cooperate with various systems of the shipping ecosystem (e.g., purchaser systems 121*a* and 121*b*, merchant systems 111*a* and 111*b*, shipping service provider system 131, shipping support services system 141, data shielding service system 151, etc.) to facilitate purchase of items and/or related functionality. Although not shown in the illustrated example of shipping environment 100, electronic marketplace system 171 may include or otherwise utilize various peripherals and/or devices, such as printers, scanners, electronic pointing devices, voice command interface devices, payment processing devices, etc.

Items purchased within shipping environment 100 are typically shipped to the purchaser or a location designated by the purchaser. For example, shipping service provider 130 (e.g., USPS, UPS, FedEx, DHL, ride sharing service, local courier, regional courier, etc.) may be utilized to provide shipping services to convey items purchased from merchants 110*a* and 110*b* to purchasers 120*a* and 120*b*, as well as to handle return of items from purchasers 120*a* and 120*b* to merchants 110*a* and 110*b*. Shipping service provider system 131 may thus be configured to cooperate with various systems of the shipping ecosystem (e.g., merchant systems 111*a* and 111*b*, purchaser systems 121*a* and 121*b*, shipping support services system 141, and/or electronic marketplace system 171) to facilitate item shipment. For example, shipping service provider system 131 may provide an interface for requesting shipping services with respect to items to be shipped, dispatching carriers to pick up item shipments, to report tracking information regarding shipped items, to route items during shipment, etc.

Shipping service provider system 131 may comprise one or more systems (e.g., web server, electronic commerce server, computer workstation, enterprise computer network, user interface portal, etc.) of a shipping service provider, such as USPS, UPS, FedEx, DHL, ride sharing service, local courier, regional courier, etc. In accordance with some embodiments, shipping service provider system 131 may comprise one or more processors (e.g., a CORE or PENTIUM processor available from Intel, Inc.) and requisite processor readable (e.g., computer readable) memory (e.g., RAM, ROM, flash memory, disk memory, SSD memory, optical memory, and/or the like) and input/output components (e.g., display, NIC, keyboard, digital pointer, printer, and/or the like) coupled to a processor of the one or more processors via a data bus. Shipping service provider system 131 may be configured to cooperate with various systems of the shipping ecosystem (e.g., purchaser systems 121*a* and 121*b*, merchant systems 111*a* and 111*b*, shipping support services system 141, data shielding service system 151, electronic marketplace system 171, etc.) to facilitate purchase of items and/or related functionality. Shipping service provider system 131 may include or otherwise utilize various peripherals and/or devices, such as printers, scanners, electronic pointing devices, voice command interface devices, etc., such as route carrier device 132, printer 133, and scanner 134 as shown in the illustrated example of shipping environment 100. Route carrier device 132 may, for example, comprise a mobile device (e.g., notebook computer, tablet device, smart phone, PDA, ruggedized field terminal, etc.) used by route carriers to scan tracking numbers, postage indicia, address information, tokens, and/or the like (e.g., whether present in human readable form, in machine readable form, or a combination thereof), to obtain recipient signatures (e.g., using a touch screen, digital input pad, etc.), to print delivery attempt notices (e.g., using an internal or external thermal or ink jet printer), to exchange data with shipping service provider system 131 (e.g., using a wired or wireless communication interface), etc. Printer 133 may comprise printer equipment (e.g., ink jet printer, laser printer, thermal printer, etc.) used by shipping service provider 130 to print shipping labels (e.g., package overlabeling), postage indicia, postage indicia cancellation marks, revised/updated address information, etc. Scanner 134 may comprise scanner equipment (e.g., optical scanner, barcode reader, image capture device, etc.) used by shipping service provider 130 to capture information on shipped items, documentation, etc. (e.g., shipping labels, postage indicia, tokens, address information, etc., whether present in human readable form, in machine readable form, or a combination thereof).

Shipping support services 140 may provide various functionality with respect to shipment of items to, for, or on behalf of one or more entities of the shipping ecosystem. For example, shipping support services system 141 of shipping support service 140 may provide one or more shipping support services functionality, such as address cleansing, customs processing, postage indicia generation, shipping management, shipping label generation, etc. In accordance with some embodiments, shipping support services system 141 may comprise one or more processors (e.g., a CORE or PENTIUM processor available from Intel, Inc.) and requisite processor readable (e.g., computer readable) memory (e.g., RAM, ROM, flash memory, disk memory, SSD memory, optical memory, and/or the like) and input/output components (e.g., display, NIC, keyboard, digital pointer, printer, and/or the like) coupled to a processor of the one or more processors via a data bus. Shipping support services system 141 may be configured to cooperate with various systems of the shipping ecosystem (e.g., purchaser systems 121a and 121b, merchant systems 111a and 111b, shipping service provider system 131, data shielding service system 151, electronic marketplace system 171, etc.) to facilitate purchase of items and/or related functionality. Although not shown in the illustrated example of shipping environment 100, shipping support service system 141 may include or otherwise utilize various peripherals and/or devices, such as printers, scanners, electronic pointing devices, voice command interface devices, payment processing devices, etc.

In an example, shipping support services system 141 may comprise a shipping management system configured to provide automation of tasks associated with the purchase and sale of items performed using purchaser systems 120a and 120b, merchant systems 110a and 110b, and/or electronic marketplace system 171 in shipping environment 100. For example, shipping support services system 131 may provide functionality for the management of item orders, managing the picking and packing of items for order fulfilment, generation of invoices, packing slips, manifests, shipping labels, and postage or other prepaid shipping indicia, and/or tracking of shipment of items through a shipping service provider. Shipping support services system 141 of some embodiments may, for example, comprise some or all of the functionality of a shipping management system, such as the SHIPSTATION shipping management system provided by Auctane LLC of Austin Texas, such as may be adapted to further facilitate tokenized shielded shipping data according to the concepts herein.

Additionally or alternatively, shipping support services system 141 may comprise a shipping indicia generation system configured to provide generation of value bearing indicia (e.g., postage meter stamps) for use with respect to shipping items purchased using purchaser systems 120a and 120b, merchant systems 110a and 110b, and/or electronic marketplace system 171 in shipping environment 100. For example, shipping support services system 131 may provide functionality for obtaining and securely storing value, accepting various shipping information for value bearing indicia generation in association with a shipment, debiting value from an appropriate vault or triggering payment processing from an assigned payment method, generating value bearing indicia (e.g., information based indicia) acceptable to a shipping service provider for shipment of items, and providing generated value bearing indicia to appropriate systems of shipping environment 100. Shipping support services system 141 of some embodiments may, for example, comprise some or all of the functionality of an online value bearing indicia generation system, such as the POSTAGEONDEMAND value bearing indicia generation system provided by Stamps.com Inc. of El Segundo California, such as may be adapted to further facilitate tokenized shielded shipping data according to the concepts herein.

Shipping environment 100 of the illustrated embodiment includes data shielding service 150 facilitating controlled and/or protected use, storage, access, dissemination, etc. of shielded shipping data with tokenization. For example, a token or tokens corresponding to a shielded shipping data record, or some portion thereof, may be provided by data shielding service system 151 for usage of shielded shipping data. Such shielded shipping data may include information for which regulatory protection is provided (e.g., PII protected by regulations of GDPR, CCPA, etc.), information for which protection is desired or otherwise advantageous with respect to a shipper/merchant, intended recipient, etc. (e.g., information regarding the shipper, the merchant, the items shipped, payment, shipping preferences and services, etc. for which some level of controlled and/or protected use is to be provided for the benefit of one or more parties). Various systems of shipping environment 100 (e.g., merchant systems 111a and 111b, purchaser systems 121a and 121b, shipping service provider system 131, shipping support services system 141, and/or electronic marketplace system 171) may, for example, interface with data shielding service system 151, such as via network 160 using an application programming interface (API) and/or other suitable interface facilitating interaction as described herein, for use, storage, access, dissemination, etc. of tokenized shielded shipping data.

Data shielding service system 151 of embodiments is configured to cooperate with merchant systems 111a and 111b, purchaser systems 121a and 121b, shipping service provider system 131, shipping support services system 141, and/or electronic marketplace system 171 to provide tokenization of shipping data provided to the data shielding service system, to enable and control a permitted accessors usage of shielded shipping data, to manage and maintain shielded shipping data in accordance with applicable regulations (e.g., GDPR, CCPA, etc.), according to applicable rules (e.g., insurance requirements, shipper/merchant guidelines, appropriate usage rules, etc.), etc. Data shielding service system 151 of embodiments may thus comprise processor-based systems operable under control of an instruction set or instruction sets defining operation as described herein. For example, data shielding service system 151 of embodiments may comprise one or more processors (e.g., a CORE or PENTIUM processor available from Intel, Inc.) and requisite processor readable (e.g., computer readable) memory (e.g., RAM, ROM, flash memory, disk memory, SSD memory, optical memory, and/or the like) and input/output components (e.g., display, NIC, keyboard, digital pointer, printer, and/or the like) coupled to a processor of the one or more processors via a data bus. Although not shown in the illustrated example of shipping environment 100, data shielding service system 151 may include or otherwise utilize various peripherals and/or devices, such as printers, scanners, electronic pointing devices, voice command interface devices, etc.

Tokenization of shipping data by data shielding service system 151 may be implemented in association with one or more other services (e.g., one or more shipping support services) provided with respect to the shipping data. For example, various entities (e.g., shipper, merchant, electronic marketplace, shipping management provider, shipping service provider, recipient, etc.) performing some aspect of shipment processing may provide shipping data for application of one or more functionalities (e.g., shipping support services, such as address cleansing, customs processing, postage indicia generation, shipping management, shipping label generation, etc.). Accordingly, in addition to data shielding logic 152 configured to provide shipping data shielding using shielded shipping data tokens according to concepts herein, data shielding service system 151 of embodiments may include shipping support services logic configured to provide functionality of one or more shipping support services. For example, data shielding service system 151 is shown in the example of FIG. 1 including address cleansing logic 142 configured to provide shipping support services in the form of address cleansing. Data shielding service system 151 is further shown in the example of FIG. 1 including customs processing logic 144 configured to provide shipping support services in the form of customs processing. In accordance with some embodiments, shipping data may be provided to data shielding service system 151 for performing a shipping support service (e.g., address cleansing by address cleansing logic 142 and/or customs processing by customs processing logic 144), whereby data shielding logic 152 tokenizes some or all the shipping data in addition to providing the shipping support services functionality. It should thus be appreciated that, although data shielding service 150 is shown in the example of FIG. 1 as separate from shipping support services 140, data shielding service 150 may itself comprise an instance of a shipping support service. Nevertheless, data shielding service 150 may provide shipping data shielding functionality to and/or in association with one or more shipping support services (e.g., shipping support services 140).

Logic of data shielding service system 151 may, for example, may comprise one or more instruction sets (e.g., program code) executed by a processor or processors of data shielding service system 151 to provide functionality as described herein. Data shielding logic 152, address cleansing logic 142, and customs processing logic 144 may each comprise an appropriate instruction set stored in memory of the data shielding service system which when executed by one or more processors of the data shielding service system provides functionality as described herein. Various other instruction sets, such as may be configured to provide other functionality described herein, may additionally or alternatively be stored in memory of the data shielding service system for execution by one or more processors of the data shielding service system to provide corresponding functionality.

In accordance with embodiments of the invention, data shielding service system 151 is available for use by one or more parties associated with shipment of items of shipping environment 100. Accordingly, data shielding service system 151 of the illustrated embodiment includes data shielding logic 152 configured to tokenize some or all shipping data provided thereto. Shielded shipping data of the tokenized shipping data may be stored by data shielding service system 151 in shielded shipping data database 153 for usage of shielded shipping data (e.g., in accordance with rules, regulations, guidelines, requirements, etc. of data shielding protocols database 154) by a permitted accessors using corresponding shielded shipping data tokens.

Figure 2:
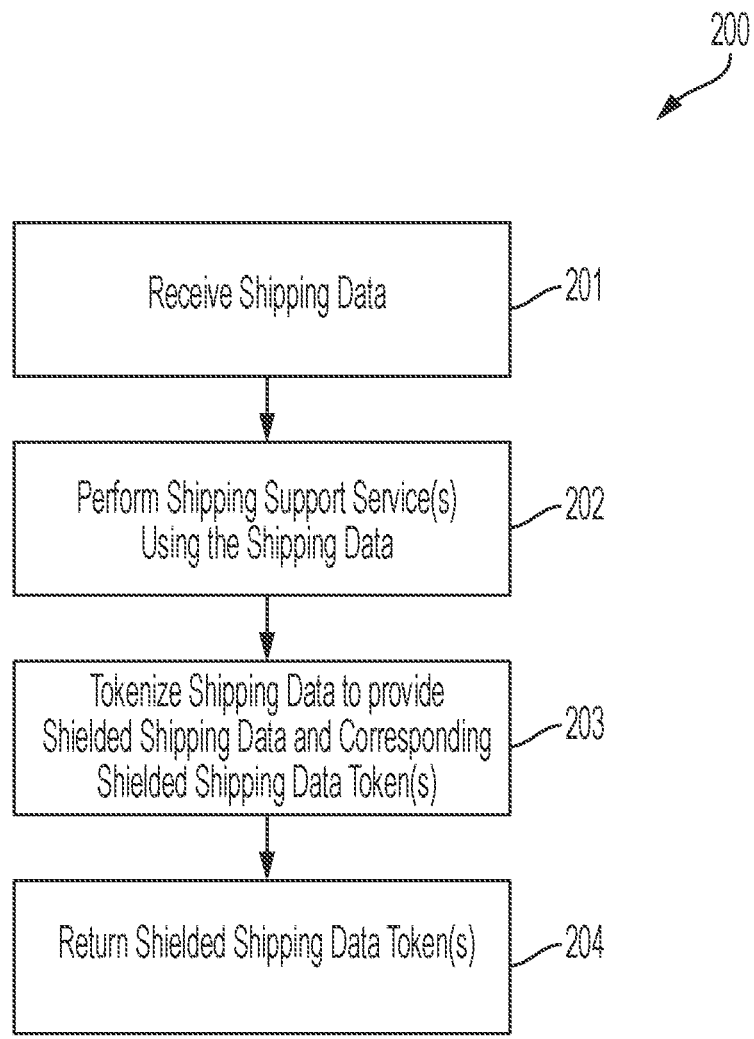
FIG. 2 shows an example flow providing tokenization of shipping data by a data shielding service system according to embodiments of the present invention.
Figure 3:
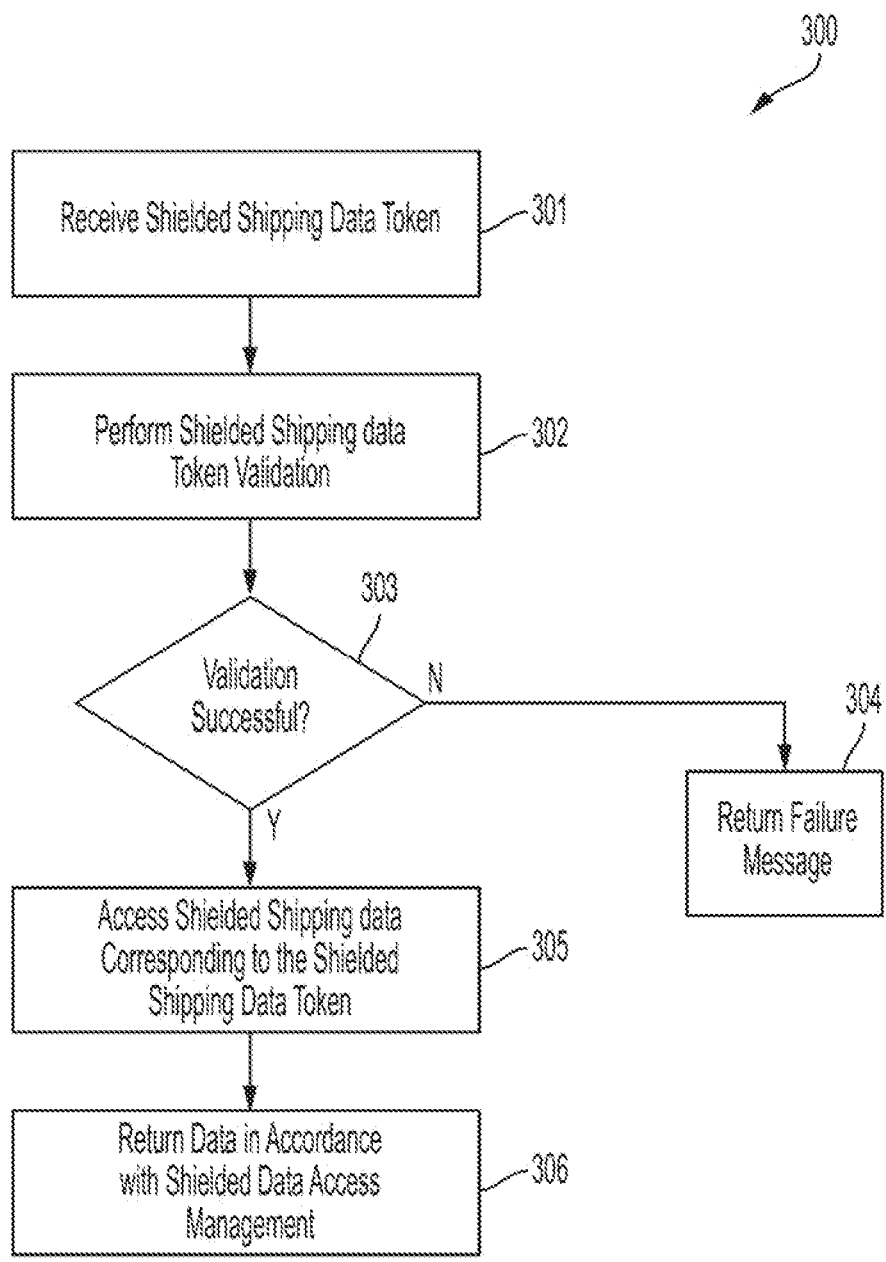
FIG. 3 shows example flow providing shielded shipping data access management by data shielding service system according to embodiments of the present invention.

FIGS. 2 and 3 show operation of a data shielding service according to some embodiments of the invention. In particular, flow 200 of FIG. 2 shows example operation providing tokenization of shipping data by data shielding service system 151 of some embodiments. Correspondingly, flow 300 of FIG. 3 shows example operation implementing shielded shipping data access management by data shielding service system 151 of some embodiments.

Referring first to the example operation providing tokenization of shipping data of FIG. 2, data shielding service system 151 receives shipping data from another system of shipping environment 100 at block 201 of flow 200. For example, a merchant or electronic marketplace may be conducting a purchase transaction with a purchaser and solicit information for item shipment (e.g., collect address information, recipient contact information, shipping preferences, customs clearance information, etc.), and may initiate processing with respect to some portion of shipping data (e.g., recipient information, customs information, item information, etc.), whereby shipping data is provided to data shielding service system 151. As another example, a merchant may be processing items for shipment (e.g., generating a shipping label, working to complete customs forms, working to determine a shipping service provider to use for the shipment and/or shipping rates, etc.) and thus may initiate processing with respect to some portion of shipping data (e.g., recipient information, customs information, item information, etc.), whereby shipping data is provided to data shielding service system 151.

In some scenarios, a merchant (e.g., one of merchants 110*a* and 110*b*) may utilize a corresponding merchant system (e.g., one of merchant systems 111*a* and 111*b*) to conduct purchase transactions and/or process items for shipment, wherein the merchant system may itself interact with data shielding service system 151 to provide shipping data thereto and/or receive data in response. For example, merchant 110*a* may be utilizing merchant system 111*a* to conduct an ecommerce transaction with purchaser system 121*a* for purchase and shipment of one of items 112*a*. Likewise, merchant 110*a* may be utilizing merchant system 111*a* and printer 113*a* to produce a shipping label for shipping an item purchased by purchaser 120*a* as one of items 112*a*. Merchant system 110*a* may thus provide shipping data, such as may include the recipient address and purchaser contact information to data shielding service system 151 in association with the purchase transaction, when processing the item for shipment, etc. (e.g., for address cleansing).

In another scenario, a merchant (e.g., one of merchants 110*a* and 110*b*) may utilize functionality of one or more other systems (e.g., shipping service provider system 131, shipping support services system 141, electronic marketplace system 171, etc.) for various operations, such as to conduct transactions with purchasers, to process items for shipment, etc., wherein a system other than the merchant system may interact with data shielding service system 151 to provide shipping data thereto and/or receive data in response. For example, merchant 110*a* may utilize merchant system 111*a* to interact with electronic commerce functionality of electronic marketplace system 171 for facilitating ecommerce transactions with purchaser systems for purchase and shipment of items 112*a*. Similarly, merchant 110*a* may utilize merchant system 111*a* to interact with shipping management functionality of shipping support service 141 or of electronic marketplace system 171 for producing a shipping label to be printed by printer 113*a* for shipping an item purchased by purchaser 120*a* as one of items 112*a*. Shipping support services system 141 or electronic marketplace system 171 may thus provide shipping data, such as may include the recipient address and purchaser contact information to data shielding service system 151 in association with processing the item for shipment (e.g., for address cleansing). As another example, merchant 110*a* may utilize merchant system 111*a* to interact with shipping management functionality of shipping support service 141 or of electronic marketplace system 171 for customs documentation for shipping an item purchased by purchaser 120*a* as one of items 112*a*. Shipping support services system 141 or electronic marketplace system 171 may thus provide shipping data, such as may include the recipient address and purchaser contact information, passport information, tax ID, item information, and/or merchant information, to data shielding service system 151 in association with processing the item for shipment (e.g., for completing customs documentation). As yet another example, merchant 110a may utilize merchant system 111a to interact with value bearing indicia generation functionality of shipping support services system 141 for producing a postage indicia to be printed by printer 113a for shipping an item purchased by purchaser 120a as one of items 112a. Shipping support services system 141 may provide shipping data, such as may include the recipient address and purchaser contact information and merchant information to data shielding service system 151 in association with processing the item for shipment (e.g., for address cleansing).

It should be appreciated that, although examples given above describe data shielding service system 151 receiving shipping data from or on behalf of a merchant for shipping support services functionality, receipt of shipping data by data shielding service system 151 is not limited to these examples and scenarios. In accordance with some embodiments, data shielding service system 151 may receive shipping data from any system of shipping environment 100. Such shipping data may or may not be in association with shipping support services functionality. For example, merchant 110a may utilize merchant system 111a to interact with shipping service provider system 131 for determining to a shipping rate for shipping an item purchased by purchaser 120a as one of items 112a, wherein some portion of shipping data handled by shipping service provider system 131 may be provided by the shipping service provider system to data shielding service system 151 for data shielding functionality (e.g., tokenizing the shipping data, without performing shipping support services). Similarly, shipping data may additionally or alternatively be received by data shielding service system 151 from merchant systems 111a and 111b, purchaser systems 121a and 121b, shipping service provider system 131, shipping support services system 141, and/or electronic marketplace system 171 for facilitating data shielding functionality in a variety of other scenarios.

The shipping data received by data shielding service system 151 may be provided to the data shielding service system without the particular system providing the shipping data itself storing the shipping data in other than transitory memory. For example, merchant systems 111a and 111b or electronic marketplace system 171 may operate to obtain recipient information from a purchaser in a purchase transaction and quickly pass this information directly to data shielding service system 151 without storing the information in non-transitory memory. In some scenarios, a particular system may not obtain the shipping data, or some portion thereof, whatsoever. For example, where merchant 110a utilizes electronic marketplace system 171 to conduct a purchase transaction with a purchaser, electronic marketplace system 171 may obtain shipping data on behalf of merchant 110a and pass that information to data shielding service system 151 (e.g., without storing the information in non-transitory memory of electronic marketplace system 171) without ever providing the shipping data, or some portion thereof, to merchant system 111a.

In operation according to flow 200 of the example shown in FIG. 2, data shielding service system 151 having received shipping data may perform one or more shipping support services using the shipping data at block 202. For example, where shipping data is provided to data shielding service system 151 merchant for shipping support services functionality, appropriate shipping support services logic may be implemented with respect to the shipping data, or some portion thereof, by the data shielding service system. According to a scenario in which shipping data is provided to data shielding service system 151 for address cleansing, the data shielding service system may invoke address cleansing logic 142 to perform address correction, validating, updating, standardization with respect to address information of the shipping data, etc. According to a scenario in which shipping data is provided to data shielding service system 151 for customs processing, the data shielding service system may invoke customs processing logic 144 to complete customs forms, report customs information, schedule customs agent handling, etc.

Although shipping support services performed by data shielding service system 151 are described above as comprising address cleansing and/or customs processing, it should be appreciated that data shielding service system 151 of embodiments may provide additional or alternative shipping support services functionality (e.g., postage indicia generation, shipping management, shipping label generation, etc.). Further, some embodiments of data shielding service system 151 may not provide shipping support services functionality, and thus performance of shipping support services may not be performed (e.g., omitting block 202 of flow 200) according to some implementations.

The shipping data received by data shielding service system 151 may include information for which its use, disclosure, and/or retention is protected or which is otherwise to be shielded in some manner. For example, intended recipient information (e.g., as may include recipient name and contact information) of the shipping data may comprise PII, which is protected in a number of ways under the GDPR, the CCPA, and/or other data privacy regulations. As another example, information regarding the items shipped, or even information regarding the merchant, of the shipping data may provide an indication of the contents of a shipment and pose a significant enough increase in the loss risk for the shipment that insurance for the shipment may be unavailable if such information is not protected, and thus comprise information to be shielded. Likewise, various usage rules, guidelines, requirements, etc. may be established with respect to various shipping data, such as by various entities that handle the shipping data or are otherwise associated with its use.

Tokenization of shipping data, or some portion thereof, is implemented by data shielding service system 151 at block 203 of example flow 200 to provide shielded shipping data and corresponding one or more shielded shipping data tokens for usage (i.e., controlled and/or protected use, storage, access, dissemination, etc.) of the shielded shipping data by permitted accessors. For example, data shielding logic 152 of data shielding service system 151 may include tokenization logic 155 configured to tokenize shipping data and generate shielded shipping data tokens utilized with respect to shielded shipping data. In accordance with some embodiments of the invention, tokenization logic 155 may analyze received shipping data (e.g., as received from a system of shipping environment 100 and/or as processed by shipping support services functionality of the data shielding service system) to determine if the shipping data, or some portion thereof, is to be shielded. Data shielding protocols database 154 may comprise information with respect to rules, regulations, guidelines, requirements, etc. (e.g., obtained from regulations, such as the GDPR, CCPA, etc., provided by various entities of shipping environment 100 performing some aspect of shipment processing, such as shippers, merchants, electronic marketplaces, shipping management providers, shipping service providers, etc., obtained from third parties, such as insurance providers, underwriters, privacy advocacy groups, etc.) and information with respect to the data (e.g., types, categories, classifications, sources, etc. of data) to which they pertain. Accordingly, tokenization logic 155 may reference data shielding protocols database 154 in analyzing shipping data to identify shipping data for shielding.

In tokenizing shipping data according to some embodiments, tokenization logic 155 may store, as shielded shipping data (e.g., in shielded shipping data database 153), at least that portion of the received shipping data identified for shielding. Storage of shielded shipping data in shielded shipping database 153 of embodiments of the invention is for a time (e.g., permitted storage duration, deleted upon appropriate request, etc.) and/or in a manner (e.g., encrypted, stored in a subscriber specific, non-comingled database, etc.) in accordance with any applicable rules, regulations, guidelines, requirements, etc. of data shielding protocols database 154. Storage of shielded shipping data by embodiments of the invention may implement shielding protocols in addition to or providing shielding in excess of that specified by rules, regulations, guidelines, requirements, etc. of data shielding protocols database 154. For example, shielded shipping data may be encrypted for storage in shielded shipping database 153 despite encryption not having been specified by any rules, regulations, guidelines, requirements, etc. of a particular data shielding protocols database 154 implementation. Similarly, shielded shipping data may be encrypted for storage in shielded shipping database 153 according to a high level of cryptography despite a lower level of, or no, cryptography having been specified by rules, regulations, guidelines, requirements, etc. of a particular data shielding protocols database 154 implementation.

Figure 4:
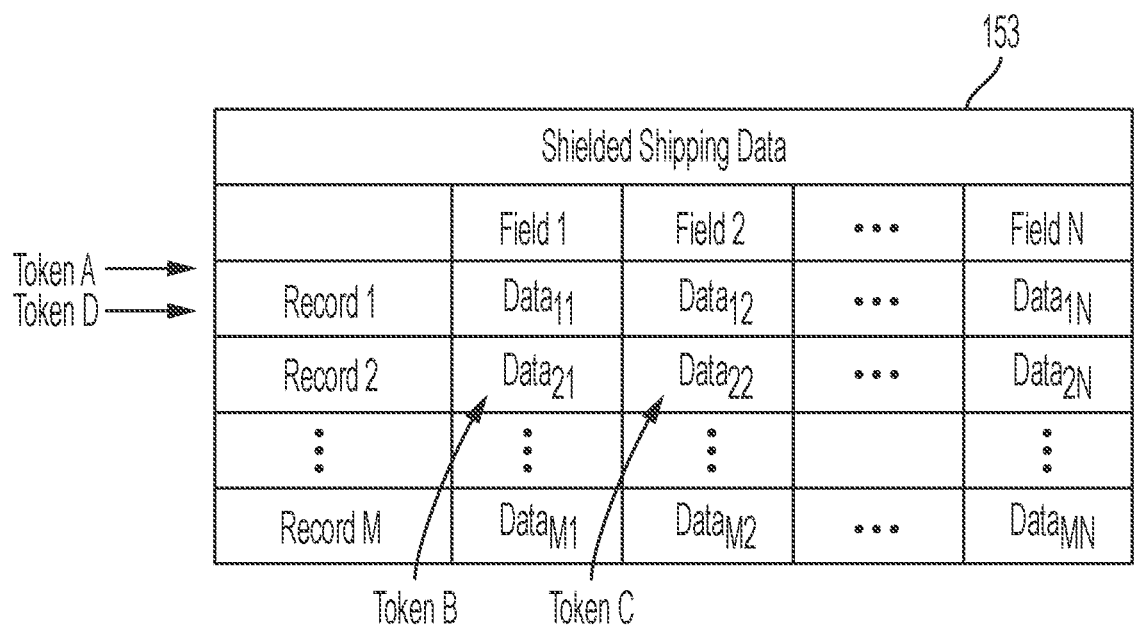
FIG. 4 shows an example of shielded shipping data within a shielded shipping data database of embodiments of the present invention.

As shown in FIG. 4, shielded shipping data may be stored as a plurality of records, shown as Record1, Record2, through RecordM in the example. Such records may correspond to shipping data of a particular transaction, entity, etc. Additionally or alternatively, records of shielded shipping data database 153 may correspond to particular portions of shipping data to be shielded. In accordance with some aspects of the invention, some or all the records of shielded shipping data database 153 may include demarcation of sub-portions of the shielded shipping data, shown as Field1, Field2, through FieldN (e.g., Record1 including data sub-portions $Data_{11}$, $Data_{12}$, through $Data_{1N}$, Record2 including data sub-portions $Data_{21}$, $Data_{22}$, through $Data_{2N}$, and RecordM including data sub-portions $Data_{M1}$, $Data_{M2}$, through $Data_{1N}$. For example, a record of shielded shipping data database 153 (e.g., Record2) may comprise recipient information, such as may include PII. The record may comprise a field (e.g., Field1) including the recipient's name (e.g., $Data_{21}$), a field (e.g., Field2) including the recipient's delivery address (e.g., $Data_{22}$), a field (e.g., FieldN-1) including the recipient's email address (e.g., $Data_{2N-1}$, not shown), and a field (e.g., FieldN) including the recipient's telephone number (e.g., $Data_{2N}$), and so on.

Figure 5:
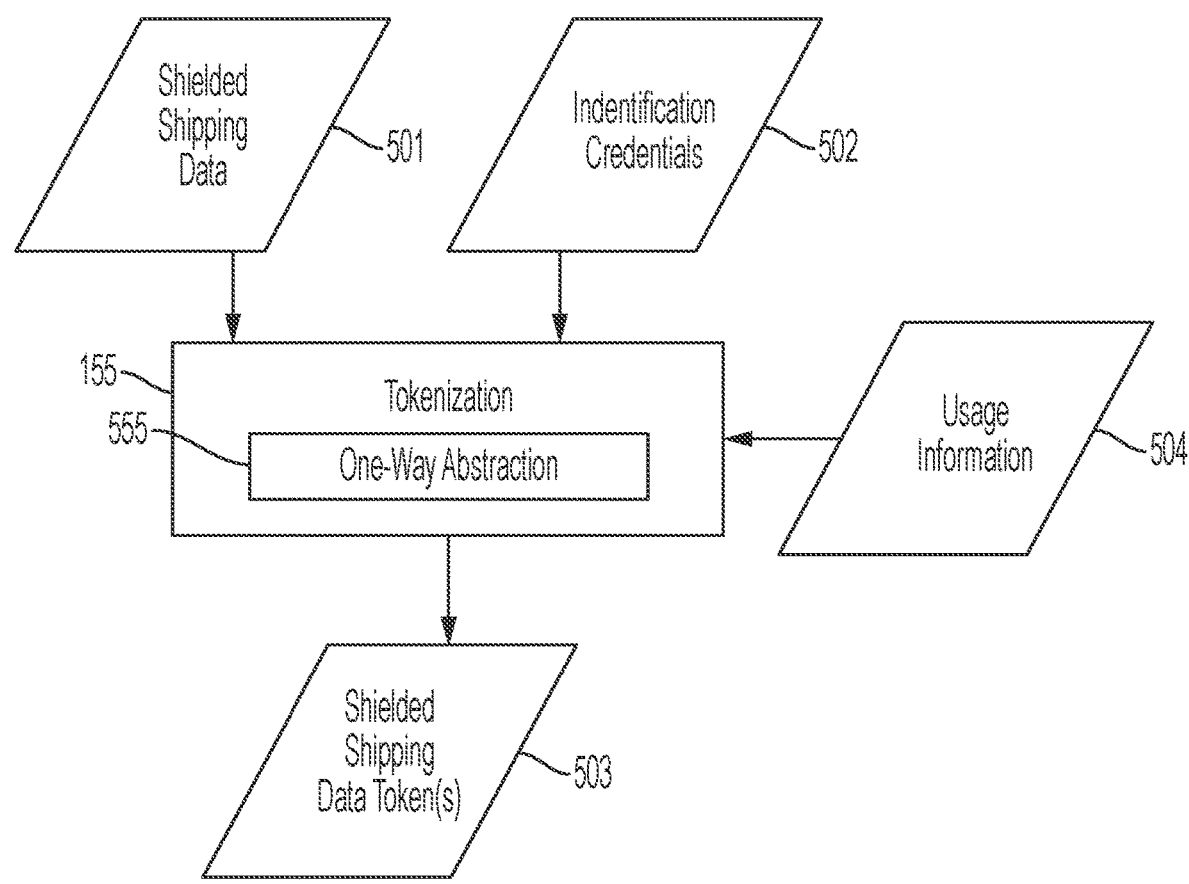
FIG. 5 shows a block diagram of tokenization logic implemented by a data shielding service system according to embodiments of the present invention.

A token or tokens corresponding to the shielded shipping data record, or some portion thereof (e.g., data field), is generated for usage of the shielded shipping data according to embodiments of the invention. For example, tokenization logic 155 may generate one or more shielded shipping data tokens for shielded shipping data of the received shipping data. A shielded shipping data token of embodiments of the invention may be uniquely tied to, associated with, and/or derived from the corresponding shielded shipping data record. For example, a shielded shipping data token may comprise a hash, digital signature, or other one-way abstraction of the corresponding shielded shipping data. As shown in FIG. 5, data of a shielded shipping data record (e.g., shielded shipping data 501, such as may comprise $Data_{x1}$, $Data_{x2}$, through $Data_{xN}$ of RecordX, or some sub-portion thereof) may be provided to tokenization logic 155 for application of one-way abstraction functionality 555 (e.g., providing hash, digital signature, or other one-way abstraction functionality) and generation of one or more shielded shipping data tokens 503.

A shielded shipping data token of embodiments of the invention may additionally or alternatively be uniquely tied to and/or associated with one or more permitted accessor. For example, a shielded shipping data token may comprise, or be based at least in part on, identification credentials for the one or more permitted accessor (e.g., integration ID, IP address, ESN, passphrase, PIN, etc.). In accordance with some embodiments, for example, shielded shipping data tokens may be matched or otherwise associated with one or more permitted accessor through embedding or linking identification credentials for a respective permitted accessor in the shielded shipping data token. As one example, identification credentials may be concatenated with the shielded shipping data prior to implementing hash, digital signature, or other one-way abstraction functionality used in generating the shielded shipping data token to thereby link the identification credentials and the shielded shipping data token. As shown in FIG. 5, data of identification credentials (e.g., identification credentials data 502, such as may comprise integration ID, IP address, ESN, passphrase, PIN, etc. for a permitted accessor) may be provided to tokenization logic 155 for application of one-way abstraction functionality 555 (e.g., providing hash, digital signature, or other one-way abstraction functionality) and generation of one or more shielded shipping data tokens 503.

Identification credentials utilized according to embodiments may be provided with the received shipping data, obtained in association with receiving the shipping data, provided by entities when registering for or otherwise provisioning systems for the data shielding service, etc. For example, identification credentials in the form of an IP address or ESN may be provided in or with a data packet containing the shipping data received by data shielding service system 151. As another example, identification credentials in the form of integration ID, passphrase, or PIN may be provided as part of a session handshaking protocol establishing or maintaining a communication link through which the shipping data is received by data shielding service system 151. In situations where a system other than or in addition to the system providing the shipping data to data shielding service system 151 is to be provided access to shielded shipping data, identification credentials for that system may be provided to data shielding service system 151 by the system providing the shipping data (e.g., in a data packet provided in association with a data packet containing the shipping data, as part of a session handshaking protocol establishing or maintaining a communication link through which the shipping data is received by data shielding service system 151, etc.). Additionally or alternatively, data shielding service system 151 may itself obtain identification credentials for a system other than or in addition to the system providing the shipping data to data shielding service system 151 (e.g., in a data exchange initiated as part of the tokenization functionality, when registering for or otherwise provisioning the system for the data shielding service, etc.).

A shielded shipping data token (e.g., TokenA and TokenD of FIG. 4) may correspond to one or more shielded shipping data records (e.g., Record2) and permit access to the entire shielded shipping data record(s) by permitted accessors, such as in accordance with applicable rules, regulations, guidelines, requirements, etc. of data shielding protocols database 154. Additionally or alternatively, a shielded shipping data token (e.g., TokenB and TokenC) may correspond to one or more sub-portions of one or more shielded shipping data records (e.g., Field1 of Record2 by TokenB and Field2 of Record2 by TokenC) and permit access to the respective sub-portion(s) by permitted accessors, such as in accordance with applicable rules, regulations, guidelines, requirements, etc. of data shielding protocols database 154.

It should be appreciated that an instance of shielded shipping data (e.g., Record2) may have a plurality of shielded shipping data tokens (e.g., TokenA and TokenD) associated therewith. For example, each time shipping data for a particular instance of shielded shipping data (e.g., a cleansed address record for a particular shipping recipient) is received by data shielding service system 151, tokenization may be performed with respect to the shielded shipping data, thus providing multiple shielded shipping data tokens for that shielded shipping data. As another example, there may be multiple permitted accessors (e.g., electronic marketplace 170/electronic marketplace system 171 that provided the shipping data to data shielding service system 151 and merchant 110a/merchant system 111a on whose behalf the shipping data was provided to data shielding service system 151) with respect to for a particular instance of shielded shipping data, and thus tokenization may be performed with respect to the shielded shipping data to provide multiple shielded shipping data tokens for each such permitted accessor. The use of multiple shielded shipping data tokens with respect to any particular instance of shielded shipping data according to embodiments facilitates anonymizing of the data, such that repeated usage of the shielded shipping data instance does not reveal the data or even its repeated use by one or more permitted accessor.

Shielded shipping data tokens may comprise or otherwise be associated with information regarding the particular shielded shipping data or portion thereof for usage, the permitted usage(s), etc. (e.g., usage information 504 of FIG. 5). For example, in addition to a hash, digital signature, or other one-way abstraction of corresponding shielded shipping data, a shielded shipping data token may comprise information regarding the shielded shipping data (e.g., types, categories, classifications, sources, etc. of data) and/or its usage (e.g., permitted uses, prohibited uses, etc.) useful to systems of shipping environment 100 in usage of the shielded shipping data. As another example, a shielded shipping data token may comprise information regarding the viability, validity, etc. of the shielded shipping data token itself (e.g., a time period in which the shielded shipping data token is valid, a geographic location in which the shielded shipping data token may be used for obtaining shipping data of corresponding shielded shipping data, etc.). Such usage information may be provided in or with a shielded shipping data token in a form decipherable by a permitted accessor system (e.g., in clear text, encrypted using a key or key pair to which a permitted accessor system has access, etc.), despite other portions of the shielded shipping data token (e.g., a hash, digital signature, or other one-way abstraction of corresponding shielded shipping data) being indecipherable by a permitted accessor system.

One or more shielded shipping data tokens are returned by data shielding service system 151 to one or more systems of shipping environment 100 at block 204 of example flow 200, such as for facilitating usage of the corresponding shielded shipping data by permitted accessors. For example, one or more shielded shipping data tokens may be provided by data shielding service system 151 to a system (e.g., merchant system 110a or 110b, shipper system 121a or 121b, shipping service provider system 131, shipping management system 141, or electronic marketplace systems 171) that provided corresponding shipping data to the data shielding service system. A shielded shipping data token provided to a system that provided the corresponding shipping data to the data shielding service system may be for use by that system, may be for provision by that system to another system (e.g., a system upon whose behalf the shipping data was provided to the data shielding service system), or a combination thereof. Additionally or alternatively, one or more shielded shipping data tokens may be provided by data shielding service system 151 to a system (e.g., merchant system 110a or 110b, shipper system 121a or 121b, shipping service provider system 131, shipping management system 141, or electronic marketplace systems 171) other than the system that provided corresponding shipping data to the data shielding service system.

In accordance with some embodiments of the invention, data shielding service system 151 may, in addition to providing one or more shielded shipping data tokens, provide some or all of the shielded shipping data to one or more systems of shipping environment 100 at block 204. For example, the system initially providing the shipping data to data shielding service system 151 may be generating a shipping label for which address cleansing is desired. Data shielding service system 151 may provide address cleansing functionality and tokenization of the cleansed address data. The cleansed address information of the shielded shipping data may be returned with one or more shielded shipping data tokens, such as to facilitate a system passing the cleansed address data to a printer for printing of a shipping label (e.g., without storing the shielded shipping data other than in transitory memory). The system receiving the shielded shipping data tokens from data shielding service 150 may store one or more of the shielded shipping data tokens (e.g., in non-transitory memory) for later usage of the shielded shipping data and/or forward one or more of the shielded shipping data tokens to another system of shipping environment 100.

Referring now to the example operation implementing shielded shipping data access management of FIG. 3, data shielding service system 151 receives a shielded shipping data token from another system of shipping environment 100 at block 301 of flow 300. For example, merchant 111a may be processing items for shipment (e.g., generating a shipping label, working to complete customs forms, working to determine a shipping service provider to use for the shipment and/or shipping rates, etc.) and thus may have a need for some portion of shielded shipping data (e.g., recipient information, customs information, item information, etc.) which is not stored by the system or systems being used by the merchant (e.g., merchant system 111a, shipping support services system 141, electronic marketplace system 171, etc.) due to the shipping data being shielded shipping data according to concepts of the present invention. Merchant system 111a may thus provide a shielded shipping data token corresponding to the relevant shielded shipping data to data shielding service system 151 for facilitating usage of some portion of shielded shipping data with respect to shipment processing. As another example, a route carrier may be handling an item (e.g., item 112) in shipment (e.g., for sorting, delivery, etc.) and thus may have a need for some portion of shielded shipping data (e.g., recipient information) which is not printed in human readable form on the item shipping label (e.g., a shielded shipping data token may be included on the shipping label in place of recipient information) due to the shipping data being shielded shipping data according to some aspects of the invention. Accordingly, route carrier device 132 may be used by the route carrier to scan a shielded shipping data token on the item being handled and provide the shielded shipping data token to data shielding service system 151 for facilitating usage of some portion of shielded shipping data with respect to handling the item.

It should be appreciated that, although examples given above describe data shielding service system 151 receiving shielded shipping data tokens from or on behalf of a merchant or from a route carrier, receipt of shielded shipping data tokens by data shielding service system 151 is not limited to these examples and scenarios. In accordance with some embodiments, data shielding service system 151 may receive shielded shipping data tokens from any system of shipping environment 100. For example, purchaser 120a may utilize purchaser system 121a to interact with shipping service provider system 131 for tracking shipment of an item purchased from merchant 110a, wherein some portion of shipping data for the shipment comprises shielded shipping data (e.g., recipient address and contact information, shipper address and contact information, item information, etc.). In such a scenario, purchaser system 121a and/or shipping service provider system 131 may provide a shielded shipping data token (e.g., generated by data shielding service system 151 in association with processing the item for shipment by merchant 110a) to data shielding service system 151 for facilitating usage of some portion of shielded shipping data with respect to the tracking and/or reporting. Similarly, shielded shipping data tokens may additionally or alternatively be received by data shielding service system 151 from merchant systems 111a and 111b, purchaser systems 121a and 121b, shipping service provider system 131, shipping support services system 141, and/or electronic marketplace system 171 for facilitating data shielding functionality in a variety of other scenarios.

In accordance with some embodiments of the invention, data shielding service system 151 may, in addition to receiving a shielded shipping data token, receive information associated with the shielded shipping data token and/or the corresponding shielded shipping data. For example, identification credentials utilized according to embodiments may be received with received shielded shipping data tokens or obtained in association with receiving the shielded shipping data tokens, such as for use by data shielding service system 151 in determining if a shielded shipping data token is received from or in association with a permitted accessor. As another example, information regarding the particular shipping data of the shielded shipping data desired, the intended usage of shipping data of the shielded shipping data, one or more instructions regarding data shielding service handling of the shielded shipping data, etc. For example, in a scenario where a shielded shipping data token (e.g., TokenA) permits access to entire one or more shielded shipping data record(s) (e.g., Record2) and only a sub-portion of the shielded shipping data is desired (e.g., the recipient's delivery address), additional information included with or in association with the shielded shipping data token may indicate the desired sub-portion (e.g., Field2). In a situation where data shielding protocols associated with the shielded shipping data proscribes certain use of the shipping data, additional information included with or in association with the shielded shipping data token may indicate the intended usage for use by data shielding service system 151 in determining compliance with applicable data shielding protocols. Additionally or alternatively, additional information included with or in association with the shielded shipping data token may provide instructions regarding handling of the shielded shipping data by data shielding service system 151 (e.g., instructions to return shipping data of the shielded shipping data to a requesting system, to update or revise shipping data of the shielded shipping data, to delete the shielded shipping data from shielded shipping data database 153, etc.). Such additional information may, for example, be provided in or with a data packet containing the shielded shipping data token received by data shielding service system 151, in a data packet provided in association with a data packet containing the shielded shipping data token received by data shielding service system 151, provided in a separate communication to data shielding service system 151, etc.

Figure 6:
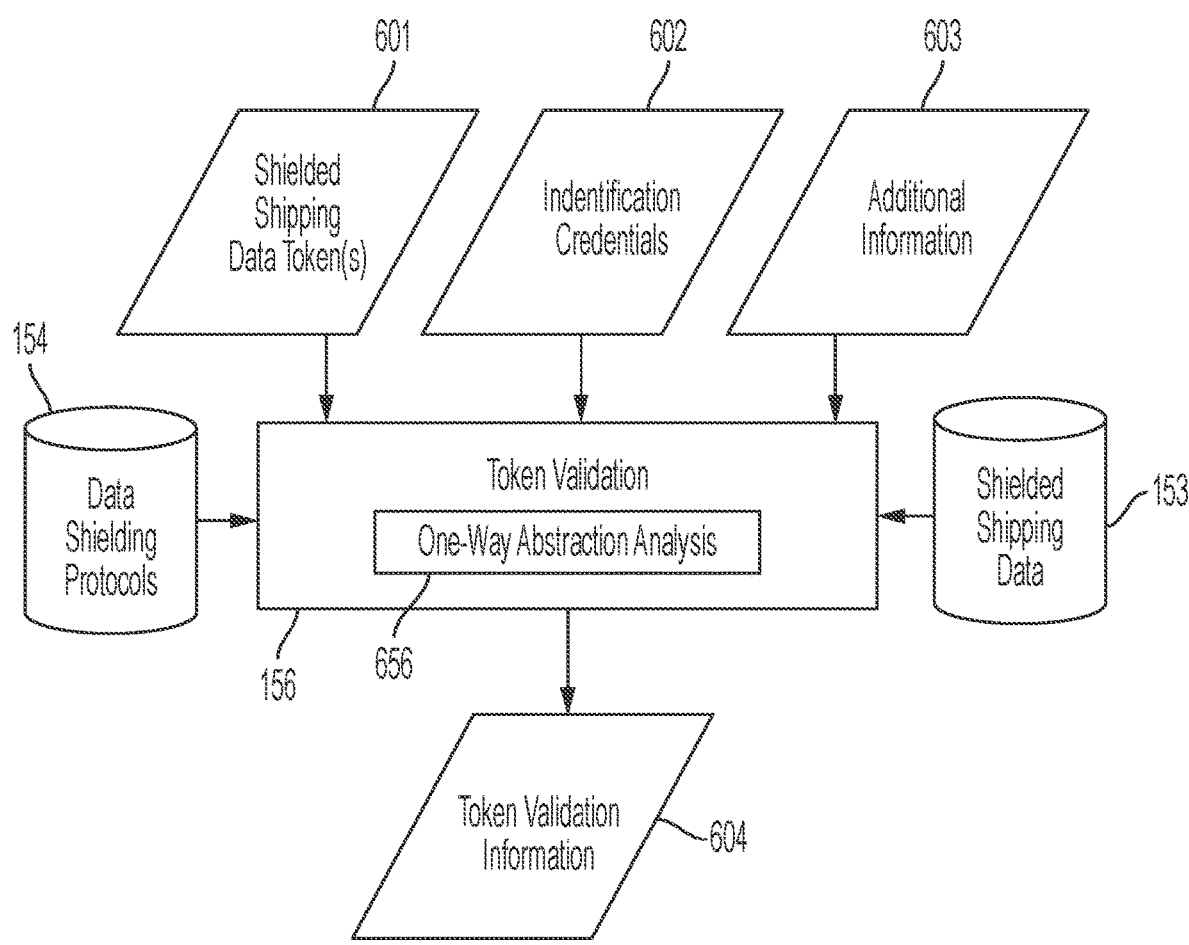
FIG. 6 shows a block diagram of token validation logic implemented by a data shielding service system according to embodiments of the present invention.

At block 302 of flow 300 in the illustrated example, data shielding service system 151 operates to perform validation processing with respect to the received shielded shipping data token. For example, data shielding logic 152 of data shielding service system 151 may include token validation logic 156 configured to perform validation with respect to shielded shipping data tokens. In accordance with some embodiments of the invention, token validation logic 156 may analyze received shielded shipping data tokens for determining validity of the token with respect to usage of shielded shipping data. For example, token validation logic 156 may analyze a received shielded shipping data token and corresponding shielded shipping data to determine if the shielded shipping data token corresponds to shielded shipping data present in shielded shipping data database 152. As shown in FIG. 6, one or more received shielded shipping data tokens (e.g., shielded shipping data tokens 601, such as may comprise any or all of TokenA, TokenB, TokenC, and TokenD, or some subset thereof) may be provided to token validation logic 156 for application of one-way abstraction analysis functionality 656 (e.g., providing comparisons of hash, digital signature, or other one-way abstraction functionality results with some portion of a shielded shipping data token) for determining validity, viability, etc. of the shielded shipping data token in association with usage of corresponding shielded shipping data (e.g., Record2).

A determination of validity of a shielded shipping data token may be based at least in part on whether the token has been received, or is otherwise being processed for, a permitted accessor. Accordingly, in accordance with some embodiments of the invention, token validation logic 156 may analyze information regarding an entity or system intending to use shipping data of the shielded shipping data. For example, token validation logic 156 may analyze a received shielded shipping data token and associated identification credentials (e.g., integration ID, IP address, ESN, passphrase, PIN, etc. of or for a system providing the shielded shipping data token and/or that is intending to use shipping data of the shielded shipping data) to determine if usage of shielded shipping data is by or on behalf of a permitted accessor. As shown in FIG. 6, identification credentials (e.g., identification credentials 602, such as may comprise integration ID, IP address, ESN, passphrase, PIN, etc.) may be provided to token validation logic 156 for performing shielded shipping data token validation. For example, is a scenario where identification credentials are concatenated with the shielded shipping data prior to implementing hash, digital signature, or other one-way abstraction functionality used in generating the shielded shipping data token, one-way abstraction analysis functionality 656 may be applied with respect to shielded shipping data tokens 601 and identification credentials 602 for determining validity, viability, etc. of the shielded shipping data token in association with usage of corresponding shielded shipping data.

In accordance with some embodiments of the invention, token validation logic 156 may analyze information regarding data shielding protocols for the shielded shipping data, intended usage of shipping data of the shielded shipping data, etc. to determine if the shielded shipping data token is valid in the particular context for performing action with respect to corresponding shielded shipping data. For example, token validation logic 156 may analyze data shielding protocols database 154 for data shielding protocols pertaining to shielded shipping data corresponding to a shielded shipping data token being validated to determine viability of the shielded shipping data token in the current context. As an example, data shielding protocols may be analyzed with respect to a shielded shipping data token to determine if the token is being presented in a time period within which the shielded shipping data token is valid, is being presented from or for use with respect to a geographic location within which the shielded shipping data token may be used for obtaining shipping data of corresponding shielded shipping data, etc.). Additionally or alternatively, additional information (e.g., additional information 603, such as may comprise information indicating the intended usage of the corresponding shielded shipping data, information indicating a particular sub-portion of the corresponding shielded shipping data for usage, etc.) in determining viability of the shielded shipping data token in the current context.

At block 303 of flow 300, data shielding logic 155 may make a determination regarding whether validation of a shielded shipping data token is successful. For example, results of validation and validity analysis (e.g., token validation information 604) performed by token validation logic 156 may be utilized to determine if validation of a shielded shipping data token is successful (e.g., the shielded shipping data token corresponds to shielded shipping data present in shielded shipping data database 152, usage of shielded shipping data is by or on behalf of a permitted accessor, usage of shielded shipping data is supported, permitted, etc. in a current context, and/or the like).

If it is determined that validation of a shielded shipping data token is not successful, processing according to the illustrated embodiment proceeds to block 304 wherein a failure message is returned. For example, data shielding service system 151 may return a message to a system from which a shielded shipping data token was received indicating that shipping data of corresponding shielded shipping data will not be provided. Such a message may include information detailing a reason for failed validation of shielded shipping data token validation (e.g., indicating that an intended usage is not permitted, that the intended usage is not within a permitted time period, associated with a permitted geographic location, is not by or for the benefit of a permitted accessor, etc.

Figure 7:
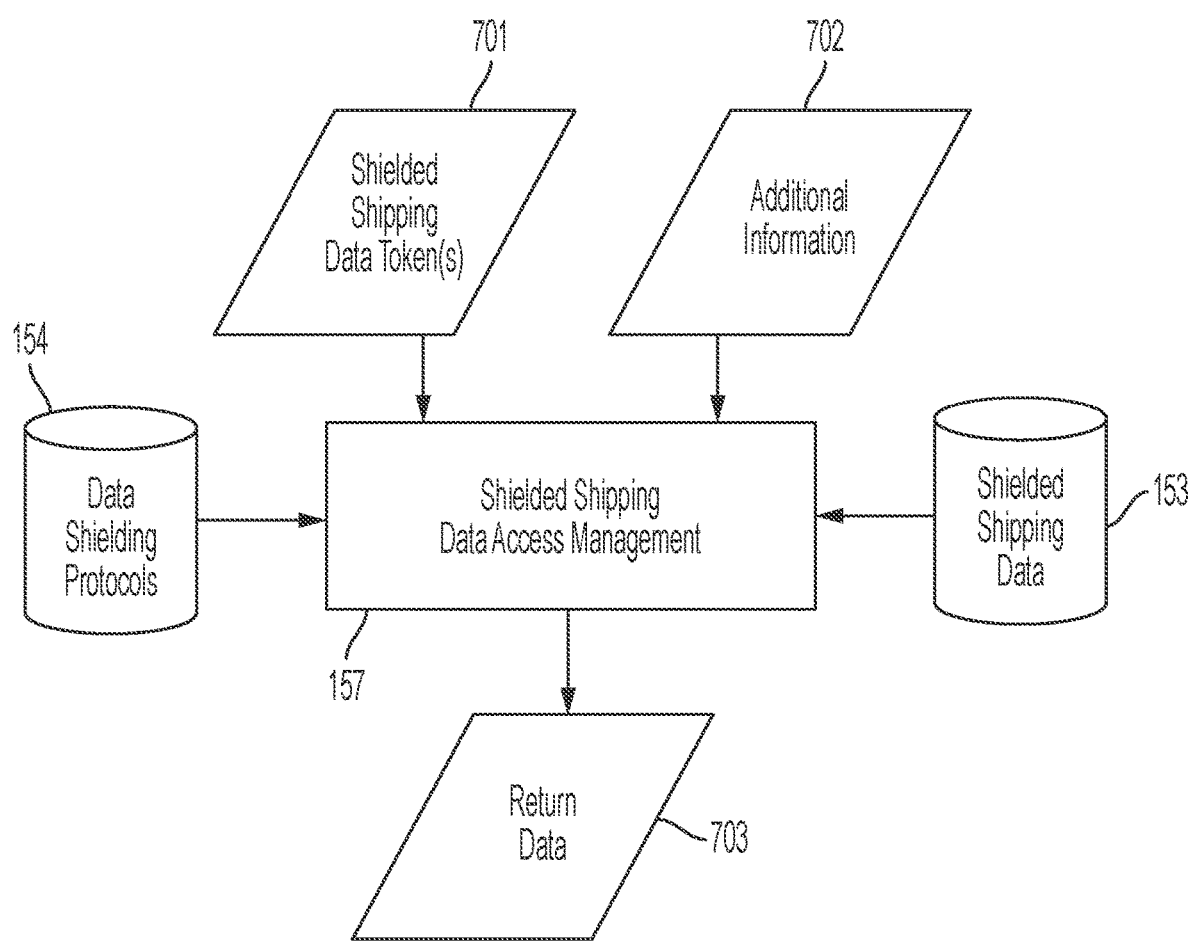
FIG. 7 shows a block diagram of shielded shipping data access management logic implemented by a data shielding service system according to embodiments of the present invention.

If it is determined that validation of a shielded shipping data token is successful, processing according to the illustrated embodiment proceeds to block 305 wherein shielded shipping data corresponding to the shielded shipping data token is accessed. For example, shielded data access management logic shielded shipping data management logic 157 of data shielding logic 152 may use a shielded shipping data token of received shielded shipping data tokens 701 to identify one or more records (e.g., records of Record1, Record2, through RecordM corresponding to a received instance of TokenA, TokenB, TokenC, or TokenD) of shielded shipping data database 153 for accessing. As shown in FIG. 7, one or more received shielded shipping data tokens (e.g., shielded shipping data tokens 701, such as may comprise any or all of TokenA, TokenB, TokenC, and TokenD, or some subset thereof) may be provided to shielded shipping data management logic 157 for use in accessing corresponding shielded shipping data of shielded shipping data database 153.

In accordance with some embodiments, shielded shipping data access management logic 157 may use information in addition to or in the alternative to shielded shipping data tokens as received by data shielding service 151. For example, information identifying the particular shipping data of shielded shipping data database 153 may be included as part of the results (e.g., token validation information 604) provided by the analysis performed by token validation logic 156, whereby shielded shipping data access management logic 157 may utilize this information to identify corresponding shielded shipping data, its intended use, one or more permitted accessor, etc. Accordingly, shielded shipping data access management logic 157 may utilize information provided by token validation logic 156 in accessing corresponding shielded shipping data of shielded shipping data database 153.

Shielded shipping data access management logic 157 may use additional information included with or in association with the shielded shipping data token for accessing shielded shipping data of shielded shipping data database 153. Accordingly, as shown in FIG. 7, additional information (e.g., additional information 702) may be provided to shielded shipping data management logic 157 for use with respect to accessing corresponding shielded shipping data. For example, additional information (e.g., information indicating the intended usage of the corresponding shielded shipping data, information indicating a particular sub-portion of the corresponding shielded shipping data for usage, instructions regarding handling of the shielded shipping data by data shielding service system 151 such as instructions to return shipping data of the shielded shipping data to a requesting system, to update or revise shipping data of the shielded shipping data, to delete the shielded shipping data from shielded shipping data database 153, etc.) received with or in association with a received shielded shipping data token may be used by shielded shipping data access management logic 157 in accessing shielded shipping data.

Access of shielded shipping data by shielded shipping data access management logic 157 is in accordance with data shielding protocols of data shielding protocols database 154 applicable to the shielded shipping data, the permitted accessor, the particular context for performing action with respect to corresponding shielded shipping data, etc. Accordingly, shielded shipping data access management logic 157 may access one or more data shielding protocols of data shielding protocols 154 corresponding to the shielded shipping data for managing access to the shipping data in accordance with applicable data shielding protocols.

At bloc 306 of flow 300 shown in FIG. 3, data shielding logic 155 may return data (e.g., return data 703) in accordance with shielded data access management functionality implemented by shielded shipping data access management 157. For example, data shielding logic 155 of embodiments may provide shipping data of the shielded shipping data to permitted accessors (e.g., transmitting shipping data of shielded shipping data database 153 corresponding to a received shielded shipping data token from data shielding service system 151 to one or more systems (e.g., one or more of merchant systems 111*a* and 111*b*, purchaser systems 121*a* and 121*b*, shipping service provider system 131, shipping support services system 141, and/or electronic marketplace system 171 that originally provided the shielded shipping data token to data shielding service system 151, on whose behalf the shielded shipping data token was provided to data shielding service system 151, etc.) of shipping environment 100. Where shipping data of the shielded shipping data is returned to other systems of shipping environment 100, the shipping data is provided to those systems by data shielding service system 151 to the extent and in accordance with applicable regulation(s)/rule(s), etc. of data shielding protocols 154 according to embodiments of the invention. Information (e.g., additional information 702, as may be provided in or with a received shielded shipping data token) may, for example, provide instructions to return shipping data of the shielded shipping data to a requesting system, another system of shipping environment 100, etc.

Return of data in accordance with shielded data access management functionality implemented by shielded shipping data access management 157 according to some scenarios may not provide shipping data of the shielded shipping data to other systems of shipping environment 100. For example, information (e.g., additional information 702, as may be provided in or with a received shielded shipping data token) indicating the intended usage of the corresponding shielded shipping data may provide instructions regarding handling of the shielded shipping data by data shielding service system 151. Such information may indicate that shipping data of the shielded shipping data is to be updated or revised by data shielding logic 152, that shielded shipping data is to be deleted from shielded shipping data database 153 by data shielding logic 152, etc. (e.g., a deletion instruction may delete particular shielded shipping data from shielded shipping data database 153, may propagate deletion requests throughout the systems of shipping environment 100 that have been provided shielded shipping data, etc.). Accordingly, where such instructions are in accordance with data shielding protocols of data shielding protocols database 154 applicable to the shielded shipping data, the instructed action may be taken with respect to the shielded shipping data and an appropriate message returned in accordance with shielded data access management logic 157. For example, data shielding service system 151 may return a message to a system from which a shielded shipping data token was received indicating that shipping data of corresponding shielded shipping data has been updated, revised, deleted, As can be appreciated from the foregoing, a shielded shipping data token may be utilized by a permitted accessor to obtain usage of shielded shipping data, such as on-demand, in real-time, etc., without systems of the permitted accessor storing shielded shipping data for extended periods of time, or at all. A data shielding service system shields usage of shielded shipping data in accordance with applicable regulations (e.g., GDPR, CCPA, etc.), according to applicable rules (e.g., insurance requirements, shipper/merchant guidelines, appropriate usage rules, etc.), and/or the like.

A retail platform (e.g., merchant systems 111*a* and 111*b*, electronic marketplace system 171, etc.) and/or other platforms of the shipping environment (e.g., shipping service provider system 131, shipping support services system 141, etc.) may avoid storing information which its use, disclosure, and/or retention is protected or which is otherwise to be shielded in some manner (e.g., certain forms of delivery information, which can be considered PII) and which is becoming a liability to store. For example, a retail platform may store one or more shielded shipping data tokens with an order when the order is placed. Such shielded shipping data tokens may be obtained by the retail platform upon successful address cleansing, such as performed as part of the order processing. When shielded information for a particular order is needed (e.g., PII used with respect to shipping label generation or other shipment processing), a corresponding shielded shipping data token may be used by the retail platform or other system of the shipping environment (e.g., shipping management system of shipping support services system 141) to perform a task (e.g., print a shipping label including PII), wherein the shielded information is discarded or otherwise not retained after performing the task. Shipping data of shielded shipping data may be provided to the retail platform or other system in a form suitable for further processing by that system (e.g., shipping data suitable for generation of a shipping label by that system) or in a form in which further processing by that system is limited or restricted (e.g., a data packet configured for printing a shipping label acceptable to a shipping service provider, thereby allowing that system to print a shipping label including the shielded information without directly processing the shielded information).

In some examples, shielded shipping data tokens may be disseminated within shipping environment 100 for shielding the data and/or alleviating various systems from handling shielded shipping data. For example, rather than providing shielded shipping data to a retail platform or other or other system of the shipping environment printing a shipping label to include shielded shipping data (e.g., PII), a shielded shipping data token may be provided for printing on the shipping label. The shielded shipping data token of this shipping label may be used in routing an item (e.g., item 112) to an intended recipient, to a shipment processing station, etc. For example, a route carrier may use route carrier device 132 to scan the shielded shipping data token on the item being handled to provide the route carrier (e.g., using a display of route carrier device 132, such as through an augmented reality user interface) with sufficient information for routing the item. The information provided to the route carrier may be limited according to the context of routing the item, so as to only provide that information needed by the route carrier to facilitate the item traveling to its next point in the shipping route. Accordingly, some or all PII of the shielded shipping data may be withheld, if not necessary in the current context. Additional or alternative protections may be implemented using shielded shipping data tokens of embodiments, such as to implement geographic location restrictions (e.g., the route carrier may only successfully obtain shipping information of shielded shipping information when at a pickup location for the item, when on the carrier's route, etc.), time restrictions (e.g., the route carrier may only successfully obtain shipping information of the shielded information during working hours, within a valid time for the shielded shipping data token, etc.), usage restrictions (e.g., the route carrier may only successfully obtain shipping information of the shielded information at a point in a workflow a next valid usage is to be performed, may obtain the shipping information a limited number of times, etc.), and/or the like. A shipping service provider may, for example, use scanner 134 to obtain a shielded shipping data token printed on a shipping label and generate a label including shipping data (e.g., recipient address information, possibly including PII) for over-labeling the item. In this example, a retail platform (e.g., merchant systems 111a and 111b, electronic marketplace system 171, etc.) may be alleviated of not only storing some shielded shipping information, but also printing that shielded shipping information and the processing associated therewith.

Although embodiments have been described above with reference to examples wherein tokenization of shielded shipping data is implemented with respect to shipment of items by or for a merchant to a purchaser or other intended recipient of items, the concepts of the present invention are not limited to use in these illustrative scenarios. In accordance with some embodiments, tokenization of shielded shipping data may be implemented in association with return shipment of items, such as to return an item to a merchant from a purchaser or other recipient of the item. For example, purchaser 120a may utilize purchaser system 121a to interact with merchant system 111a for processing return of an item purchased from merchant 110a, wherein some portion of shipping data for the return comprises shielded shipping data (e.g., merchant 110a may comprise a customer-to-customer (C2C) type merchant wishing to protect their personal contact and address information). In such a scenario, purchaser system 121a may be provided a shielded shipping data token, such as for printing on a return shipping label (e.g., for later over-labeling the item by a shipping service provider).

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, the scope of the present application is not intended to be limited to the particular embodiments of the process, machine, manufacture, composition of matter, means, methods and steps described in the specification.

What is claimed is:

1. A method comprising:
receiving, by a data shielding service system of a shipping environment, a shielded shipping data token from a first system of the shipping environment;
performing, by the data shielding service system, validation of the shielded shipping data token and determine that a validation of the shielded shipping data token is successful, wherein the performing validation of the shielded shipping data token includes analyzing information regarding data shielding protocols for shielded shipping data to determine the shielded shipping data token is valid in a current context;
accessing, by the data shielding service system, shipping data of shielded shipping data stored in a non-transitory memory of the data shielding service system corresponding to the shielded shipping data token, wherein the shielded shipping data as stored is configured to facilitate usage of at least a portion of the shipping data by other systems of the shipping environment without storage of the at least a portion of the shipping data using a non-transitory memory by the other systems; and
returning, by the data shielding service system, the shipping data of the stored shielded shipping data to the first system.

2. The method of claim 1, wherein the receiving the shielded shipping data token from the first system is in association with the first system performing a shipment processing operation which utilizes the shipping data.

3. The method of claim 1, wherein the performing validation of the shielded shipping data token comprises:
analyzing the shielded shipping data token and corresponding shielded shipping data to determine if the shielded shipping data token corresponds to the shielded shipping data stored in the non-transitory memory of the data shielding service system.

4. The method of claim 3, wherein the analyzing the shielded shipping data token comprises: applying one-way abstraction analysis functionality for determining the validity of the shielded shipping data token by providing comparisons of one-way abstraction functionality results with some portion of a shielded shipping data token stored in the non-transitory memory of the data shielding service system.

5. The method of claim 3, wherein the analyzing the shielded shipping data token comprises:
analyzing information regarding an entity or system intending to use the shipping data of the shielded shipping data.

6. The method of claim 5, wherein the analyzing information regarding the entity or system intending to use the shipping data of the shielded shipping data comprises:
analyzing the received shielded shipping data token and associated identification credentials to determine if usage of the shielded shipping data is by or on behalf of a permitted accessor.

7. The method of claim 3, wherein the analyzing information regarding data shielding protocols for the shielded shipping data to determine the shielded shipping data token is valid in the current context includes determining the shielded shipping data token is being presented in a time period within which the shielded shipping data token is valid, determining the shielded shipping data token is being presented from a geographic location within which the shielded shipping data token may be used for obtaining the shipping data, or determining the shielded shipping data token is being presented for use with respect to a geographic location within which the shielded shipping data token may be used for obtaining the shipping data.

8. The method of claim 7, wherein the analyzing information regarding data shielding protocols for the shielded shipping data comprises:
analyzing an intended usage of the shipping data of the shielded shipping data.

9. The method of claim 1, further comprising:
storing, by the data shielding service system in the non-transitory memory of the data shielding service system, a data shielding protocols database, wherein the returning the shipping data of the stored shielded shipping data to the first system is in accordance with data shielding protocols of the data shielding protocols database corresponding to the shielded shipping data.

10. The method of claim 1, wherein the shipping data includes personally identifiable information (PII).

11. The method of claim 1, wherein the shipping data includes data for which user defined rules regarding usage of shipping data are applicable.

12. The method of claim 1, further comprising:
receiving, by the data shielding service system, first shipping data from the first system;
tokenizing, by the data shielding service system, at least a portion of the first shipping data to provide one or more shielded shipping data tokens for the at least a portion of the first shipping data, wherein the one or more shielded shipping data tokens include the shielded shipping data token, and wherein the at least a portion of the first shipping data provides the shipping data of the shielded shipping data corresponding to the shielded shipping data token;
storing, by the data shielding service system, the at least a portion of the first shipping data in the non-transitory memory as the shipping data of the shielded shipping data corresponding to the shielded shipping data token; and
returning, by the data shielding service system, the shielded shipping data token to the first system.

13. A data shielding service system comprising:
a shielding shipping data database storing shielded shipping data, wherein the shielded shipping data comprises shipping data of a plurality of sales transactions conducted in a shipping environment;
a data shielding protocols database storing data shielding protocols corresponding to shipping data of the shielded shipping data;
shipping support services logic, executed by one or more processors of the data shielding service system, configured to provide a shipping support service with respect to the shipping data of the plurality of sales transactions; and
data shielding logic, executed by the one or more processors of the data shielding service system, configured to facilitate shielded shipping data token-based usage of portions of the shipping data of the shielded shipping data by other systems of the shipping environment without storage of the portions of the shipping data of the shielded shipping data using non-transitory memory by the other systems, wherein the data shielding logic includes tokenization logic, executed by the one or more processors of the data shielding service system, configured to generate shielded shipping data tokens for respective portions of the shielded shipping data received from the other systems of the shipping environment, and wherein generation of the shielded shipping data tokens by the tokenization logic is performed in addition to providing the shipping support service with respect to respective portions of the shielded shipping data received from the other systems of the shipping environment, and wherein the data shielding logic is configured to store the shielded shipping data in the shielding shipping data database for only as long as permitted by applicable rules of the data shielding protocols and to propagate deletion instructions throughout the other systems of the shipping environment that have been provided shielded shipping data subject to deletion according to the applicable rules.

14. The data shielding service system of claim 13, wherein the shipping data of the plurality of sales transactions includes personally identifiable information (PII).

15. The data shielding service system of claim 13, wherein the shipping data of the plurality of sales transactions includes data for which user defined rules regarding usage of the shipping data are applicable.

16. The data shielding service system of claim 13, wherein the tokenization logic is configured to apply a one-way abstraction functionality to at least a portion of the shipping data.

17. The data shielding service system of claim 13, wherein the tokenization logic is configured to apply a one-way abstraction functionality to identification credentials of a permitted accessor of the shielded shipping data.

18. The data shielding service system of claim 13, wherein the tokenization logic is configured to include usage information with a one-way abstraction of the at least a portion of the shipping data.

19. The data shielding service system of claim 13, wherein the shipping support service is a shipping support service selected from a group consisting of postage indicia generation and shipping label generation.

20. The data shielding service system of claim 19, wherein the shipping support service comprises address cleansing.

21. The data shielding service system of claim 13, wherein the data shielding logic comprises:
token validation logic, executed by the one or more processors of the data shielding service system, configured to perform validation of shielded shipping data tokens received from the other systems of the shipping environment.

22. The data shielding service system of claim 21, wherein the token validation logic is configured to access shielded shipping data of the shielding shipping data database for validating a shielded shipping data token.

23. The data shielding service system of claim 21, wherein the token validation logic is configured to access the data shielding protocols of the data shielding protocols database for validating a shielded shipping data token.

24. The data shielding service system of claim 21, wherein the data shielding logic comprises:
shielded shipping data access management logic, executed by the one or more processors of the data shielding service system, configured to access shipping data of the shielded shipping data stored in the shielded shipping data database, corresponding to a shielded shipping data token determined to be valid.

25. The data shielding service system of claim 24, wherein the shielded shipping data access management logic is further configured to return shipping data of the stored shielded shipping data to a system of the other systems that provided the shielded shipping data tokens determined to be valid.

* * * * *